US008738068B2

United States Patent
Kim et al.

(10) Patent No.: US 8,738,068 B2
(45) Date of Patent: May 27, 2014

(54) APPARATUS FOR CONTROLLING TRANSMISSION DATA AND METHOD THEREOF

(75) Inventors: Joong Heon Kim, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 13/059,302

(22) PCT Filed: Sep. 11, 2009

(86) PCT No.: PCT/KR2009/005163
§ 371 (c)(1),
(2), (4) Date: Feb. 16, 2011

(87) PCT Pub. No.: WO2010/032936
PCT Pub. Date: Mar. 25, 2010

(65) Prior Publication Data
US 2011/0136523 A1 Jun. 9, 2011

Related U.S. Application Data

(60) Provisional application No. 61/099,199, filed on Sep. 22, 2008.

(30) Foreign Application Priority Data

Dec. 29, 2008 (KR) .................. 10-2008-0135509

(51) Int. Cl.
*H04B 7/00* (2006.01)
*H04B 1/00* (2006.01)
*H04B 17/00* (2006.01)
(52) U.S. Cl.
USPC ........... 455/522; 455/9; 455/127.1; 455/63.1; 455/67.13

(58) Field of Classification Search
CPC ...................................... H04W 52/16
USPC ......... 455/550.1, 69, 127.1, 522, 63.1, 67.11, 455/67.13, 226.1
See application file for complete search history.

(56) References Cited

U.S. PATENT DOCUMENTS

| | | | |
|---|---|---|---|
| 6,850,771 B2 * | 2/2005 | Malladi et al. | 455/522 |
| 7,457,590 B2 * | 11/2008 | Frank | 455/69 |
| 7,636,573 B2 * | 12/2009 | Walton et al. | 370/328 |
| 7,711,386 B2 * | 5/2010 | Sung et al. | 455/522 |
| 7,738,428 B2 * | 6/2010 | Medvedev et al. | 455/226.3 |
| 7,907,972 B2 * | 3/2011 | Walton et al. | 455/103 |
| 7,920,888 B2 * | 4/2011 | Beming et al. | 455/522 |
| 8,280,445 B2 * | 10/2012 | Yong et al. | 455/562.1 |
| 8,467,340 B2 * | 6/2013 | Medvedev et al. | 455/522 |
| 2006/0221847 A1 * | 10/2006 | Dacosta | 370/252 |
| 2007/0002742 A1 | 1/2007 | Krishnaswamy et al. | |
| 2007/0178939 A1 | 8/2007 | Raftelis et al. | |
| 2008/0084917 A1 | 4/2008 | Sung et al. | |

* cited by examiner

*Primary Examiner* — Tilahun B Gesesse
(74) *Attorney, Agent, or Firm* — Birch, Stewart, Kolasch & Birch, LLP

(57) ABSTRACT

A method for controlling data transmission in a station in a wireless communication network is discussed. The method includes: receiving feedback information including error information including a signal to noise ratio (SNR) from a target station, the error information being measured by the target station; and controlling transmission parameters of the transmit data in a transmitting station based on the error information, wherein controlling the transmission parameters includes: increasing the transmit power when the SNR is lower than a predetermined value; initiating a beam-tracking process when the SNR is still lower than the predetermined value after increasing the transmit power; and decreasing a data transmission rate when the SNR is still lower than the predetermined value after initiating the beam-tracking process.

16 Claims, 3 Drawing Sheets

APPARATUS FOR CONTROLLING TRANSMISSION DATA AND METHOD THEREOF

This application is the National Phase of PCT/KR2009/005163 filed on Sep. 11, 2009, which claims priority under 35 U.S.C. 119(e) to U.S. Provisional Application No. 61/099,199 filed on Sep. 22, 2008 and under 35 U.S.C. 119(a) to Korean Application No. 10-2008-0135509 filed on Dec. 29, 2008. The entire contents of these applications are hereby incorporated by reference into the present application.

TECHNICAL FIELD

The present invention relates to a short-range wireless communication network, and more particularly, to an apparatus for controlling the transmission of data and method thereof. Although the present invention is suitable for a wide scope of applications, it is particularly suitable for controlling transmission power or transmission data rate of a transmitter in a station.

BACKGROUND ART

As the number of wireless communication stations joining a wireless network increases, the possibility problems such as collision, data loss, etc. increase. A collision requires data to be retransmitted that significantly affects the throughput of the wireless communication network. In particular, if a higher quality of service (QoS) is necessary for audio/video (AV) data and other such data, it is very important to secure more available bandwidth by decrease the occurrences of retransmissions.

Moreover, because of increasing demand for transmitting high quality video data between various home stations, the demand for a technical standard for transmitting and receiving high-quality video, which requires a broad bandwidth, is increasing.

Millimeter wave (mmWave) communication uses carrier frequency having a physical wavelength on the order of millimeters (i.e., frequency ranging between 30 GHz and 300 GHz) for very high rate data transmission. In general, this frequency band is an unlicensed band and has been limitedly used by communication service providers, in radio astronomy, in vehicle collision prevention, etc.

In a mmWave communication system, a carrier frequency of 60 GHz typically may be used with a channel bandwidth is about 0.5-2.5 GHz. Therefore, the mmWave communication system has a carrier frequency and channel bandwidth considerably greater than those of the conventional IEEE 802.11 series standard, respectively.

A mmWave carrier frequency is able to provide a very high transmission data rate of several gigabits (Gbps). A mmWave transmitter and receiver may be implemented on a single chip including an antenna having a size of less than 1.5 mm. Moreover, because the attenuation in air of mmWave signals is very high, inter-station interference may be reduced.

On the other hand, the high attenuation of mmWave signals reduces the range over which these signals may be effectively used. Therefore, it is difficult to transmit a mmWave signal omni-directionally. Beamforming may be used to solve this problem. Beamforming results in the mmWave signal being received by a reduced number of stations that are within the beam.

In a general method for generating a beam link, a transmitter forms beams in random directions and a receiver then responds back on a usable beam. After the link has been established, the searching process is repeated to account for any changes in the link. This is called "Tracking". For this tracking and search, channel time is used. As the number of beam links increases in a given network, the time dedicated to the beam search and the tracking increases. Therefore, a method of performing theses processes most simply and efficiently is necessary.

FIG. 1 is a diagram that depicts an example of a short-range network according to an embodiment of the present invention.

Referring to FIG. 1, a notebook computer A, a monitor B, a personal media player (PMP) C and an external hard disk drive E may be mutually connected by a wireless communication network. In this case, a beam link may be established between the notebook computer A and the monitor B, a beam link may be established between the notebook computer A and the PMP C, and/or a beam link may be established between the notebook computer A and the external hard disk drive E.

FIG. 2 is a diagram depicting an example of beam patterns radiated by the stations shown in FIG. 1, respectively.

Referring to FIG. 2, a plurality of stations A to F may simultaneously radiate beam patterns. In this case, because frequency bands allocated to the stations differ from each other, interference generally does not occur.

In a network using the above beam links, a related art wireless communication system adjusts the data rate using autorate fall back (AFB). In the AFB, various data rate levels are available. The data rate may be raised by one level if data is transmitted at least ten times without an error. The data rate is lowered by one level if an error occurs in at least three consecutive data transmissions.

DISCLOSURE OF INVENTION

Technical Problem

There are two problems in the above-described method. First, although AFB is widely used, it is unable to reliability decode data transmissions as the data rate is raised. In AFB, the error rate determines when to adjust the data rate, but AFB does not include the ability to discriminate a data transmission error from a collision. Therefore, it is difficult to adjust the data rate accurately. Moreover, AFB does not operate effectively an environment having a very low signal to noise ratio (SNR).

Technical Solution

Accordingly, the present invention is directed to an apparatus for controlling transmission data and method thereof that substantially obviates one or more of the problems due to limitations and disadvantages of the related art.

An advantage of the present invention is to provide a method of controlling transmission data including a control of a transmission power by receiving error information.

Another advantage of the present invention is to provide a method of controlling transmission data accurately by performing adjustment of a transmission rate or transmission power and a beam tracking process in a manner of discriminating error and collision from each other.

A another advantage of the present invention is to provide a method of adjusting a transmission power for transmission data transmitting control by exchanging a transmission power control report between stations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for controlling data transmission in a station in a wireless communication network, the method including: receiving feedback information including error information from a target station, the error information being measured by the target station; and controlling transmission parameters of the transmit data in a transmitting station based on the error information.

In another aspect of the present invention, a method for controlling data transmission in a station in a wireless communication network, the method including: transmitting a request command to a target station, the request command requesting a transmit power control report; receiving a response command from the target station, the response command including a request to adjust the transmit power; and controlling the transmit power based on the response command.

In another aspect of the present invention, A method for controlling data transmission in a station in a wireless communication network, the method including: determining whether a data collision or a data transmission error is the cause of a failure in data communication from the station, when data transmitted from the station is not received at another station; performing a beam tracking process when the data collision is determined; and controlling a transmit power of the station when the data transmission error is determined.

In another aspect of the present invention, an apparatus for controlling data transmission in a wireless station, the apparatus including: a communication module configured to receive data from an external station, and configured to transmit data to the external station; and a controller configured to control the communication module to receive feedback information including error information from the external station, the error information being measured by the external station, and configured to control the transmit data based on the error information.

In another aspect of the present invention, an apparatus for controlling data transmission in a wireless station, the apparatus including: a communication module configured to receive data from an external station, and configured to transmit data to an external station; and a controller configured to control the communication module by transmitting a request command to the external station, the request command requesting a transmit power control report from the external stations, wherein the controller is configured to control the communication module to receive the transmit power control report from the external station, wherein the transmit power control report includes a request to adjust the transmit power, and wherein the controller is configured to control the transmit power based on the transmit power control report.

In another aspect of the present invention, an apparatus for controlling data transmission in a wireless station, the apparatus including: a communication module configured to receive data from an external station, and configured to transmit data to an external station; and a controller configured to determine whether a data collision or a data transmission error is the cause of a failure in data communication from the station, when data transmitted from the station is not received at another station, and the controller is configured to perform a beam tracking process when the data collision is determined, and the controller is configured to control a transmit power of the station when the data transmission error is determined.

In another aspect of the present invention, a method for controlling data transmission in a station in a wireless communication network, the method including: receiving feedback information including error information including a signal to noise ratio (SNR) from a target station, the error information being measured by the target station; and controlling transmission parameters of the transmit data in a transmitting station based on the error information, wherein controlling the transmission parameters includes: increasing the transmit power when the SNR is lower than a predetermined value; initiating a beam-tracking process when the SNR is still lower than the predetermined value after increasing the transmit power; and decreasing a data transmission rate when the SNR is still lower than the predetermined value after initiating the beam-tracking process.

It is to be understood that both the foregoing general description and the following detailed description are exemplary and explanatory and are intended to provide further explanation of the invention as claimed.

Advantageous Effects

An advantage of the present invention is to provide a method of controlling transmission data including a control of a transmission power by receiving error information.

Another advantage of the present invention is to provide a method of controlling transmission data accurately by performing adjustment of a transmission rate or transmission power and a beam tracking process in a manner of discriminating error and collision from each other.

A another advantage of the present invention is to provide a method of adjusting a transmission power for transmission data transmitting control by exchanging a transmission power control report between stations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

The following exemplary embodiments of the present invention may be modified into various forms and the scope of the present invention including the appended claims and their equivalents is not limited to the following embodiments.

A certain SNR is required to guarantee the reliability data transmission in a wireless communication. The SNR may be adjusted by adjusting the data transmission rate and/or adjusting the transmission power. For example, whenever the data transmission rate is adjusted, the transmission power may be adjusted as well to achieve a desired SNR.

Measured data transmission errors provide the basis for adjusting data transmission rate. Yet, the cause of data being incorrectly received may be either data transmission errors or data collisions. In the following description, a scheme for accurately discriminating data transmission errors from data collisions is explained.

Figure 1:
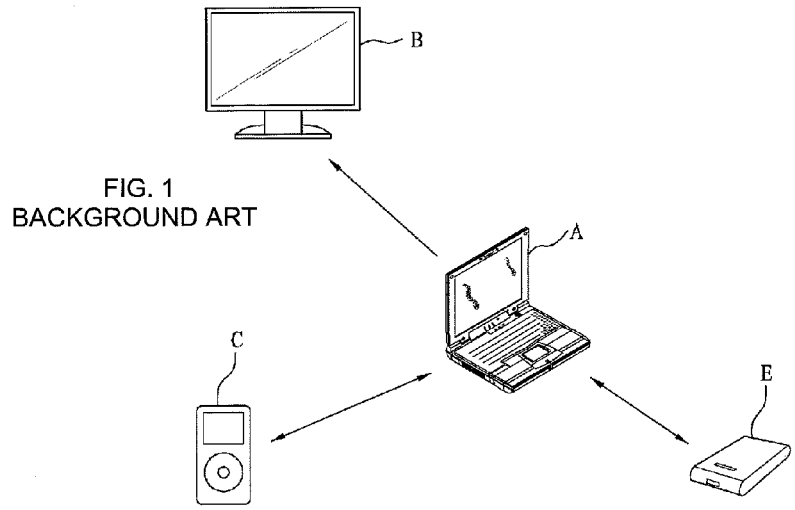
FIG. 1 is a diagram depicting an example of a short-range network to which the present invention is applied.
Figure 2:
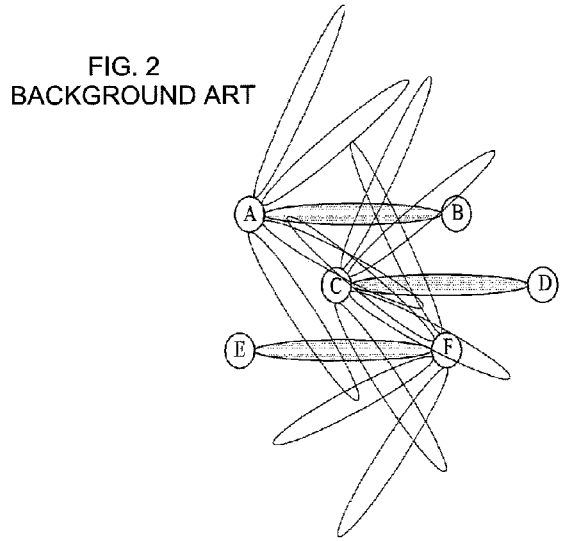
FIG. 2 is a diagram depicting an example of beam patterns radiated by the stations shown in FIG. 1, respectively.
Figure 3:
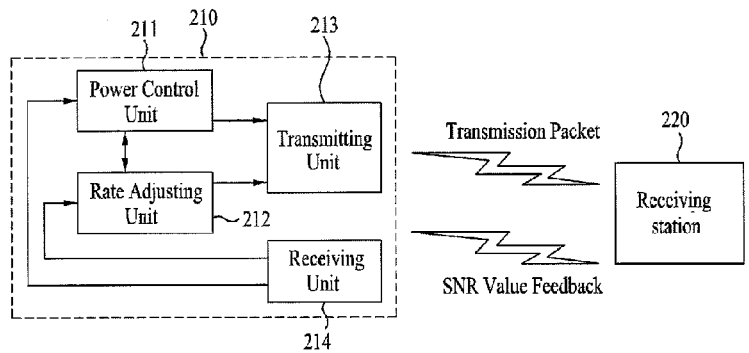
FIG. 3 is a block diagram depicting a transmitting station and a receiving station according to one embodiment of the present invention.

FIG. 3 is a block diagram depicting a transmitting station and a receiving station according to one embodiment of the present invention.

Referring to FIG. 3, a transmitting station 210 in a short-range wireless network includes a power control unit 211, a rate adjusting unit 212, a transmitting unit 213 and a receiving unit 214. Alternatively, a single functional block may implement both the power control unit 211 and the rate adjusting unit 212.

The power control unit 211 controls transmission power based on error information received from a receiving station 220. The error information may contain a signal to noise ratio (SNR) and/or a packet error rate (PER). One embodiment of the present invention uses SNR as part of the error information. Other measurements that indicate the presence of data transmission errors may be used as well.

If the SNR measured by the receiving station 220 is smaller than a predetermined value, the transmitting station 210 increases its transmission power.

The transmitting station 210 may transmit a command requesting a transmission power control report to the receiving station 220. When the transmission power control report is received from the receiving station 220, the transmitting station 210 may control the transmission power according to the transmission power control report.

If the SNR value of the receiving station 220 is still smaller than the predetermined value after the transmission power has been adjusted, the transmitting station 210 may perform beam tracking. In particular, if the SNR is very low, the transmission power is raised to increase SNR over the predetermined value. If the SNR is still less than the predetermined value after increasing the transmission power, beam forming may be used to further increase the SNR.

Meanwhile, after implementing beam tracking, if the SNR value of the receiving station is still smaller than the predetermined value, the rate adjusting unit 212 lowers the transmission rate of the transmitting station 210.

The transmitting unit 213 transmits a packet to the receiving station 220. The receiving station 220 receives the packet, measures the SNR, and then transmits the measured SNR value back to the transmitting station 210.

The receiving unit 214 receives the measured SNR value from the receiving station 220.

Figure 4:
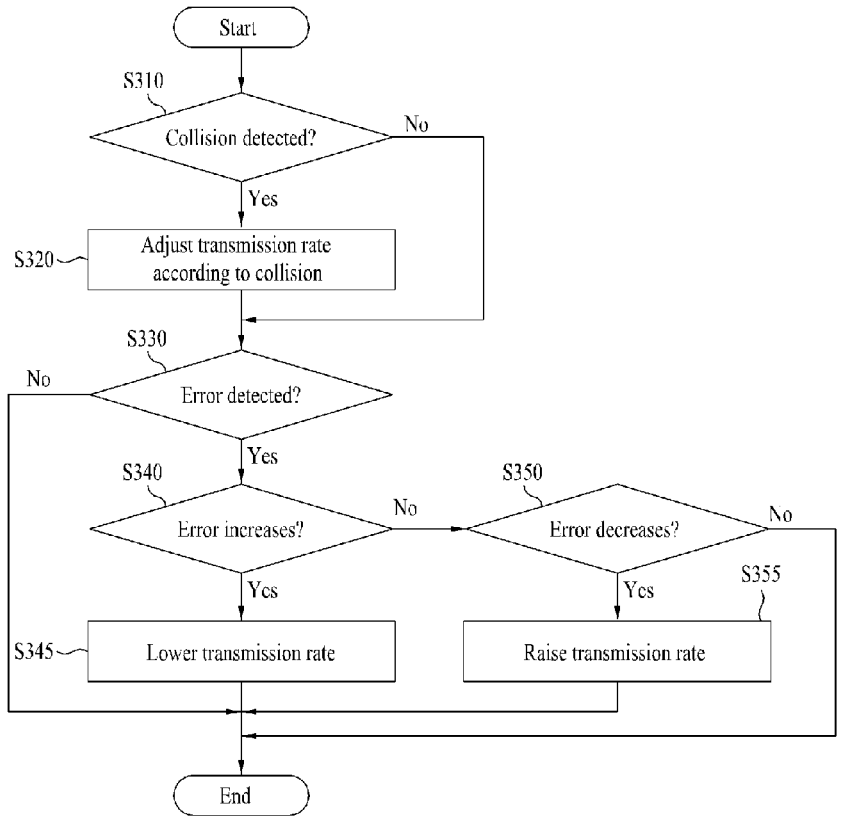
FIG. 4 is a flowchart that depicts a transmission rate adjusting method according to an embodiment of the present invention.

FIG. 4 is a flowchart that depicts a transmission rate adjusting method according to an embodiment of the present invention.

Referring to FIG. 4, if a data collision is detected by the receiving station, the transmitting station adjusts the transmission rate according to a predefined algorithm for data collisions [S310, S320].

Even when a data collision does not occur at the receiving station, if a data transmission error is detected [S330], the transmitting station adjusts the transmission rate in response to an increase or decrease of the error frequency. If the frequency of data transmission errors increases [S340], the transmitting station lowers the transmission rate [S345]. On the contrary, if the frequency of data transmission errors decreases [S350], the transmitting station raises the transmission rate [S355]. In particular, if data transmission errors occur frequently, the transmission data rate is lowered. Otherwise, the transmission data rate is raised.

Thus, in order to properly compensate for data transmission problems, it is important to be able to discriminate between data transmission errors and data collisions. In particular, in order to precisely adjust the transmission rate, the error detection should be precise.

Moreover, it is possible to determine the presence or absence of data collisions/data transmission errors at the receiving station. If a data collision occurs, a beam tracking process may be implemented. If a data transmission error occurs, the transmission power may be adjusted.

In FIG. 3, the receiving station 220 may discriminate data transmission errors from data collisions by observing data reception states in a physical layer (PHY) and in a MAC layer.

Figure 5:
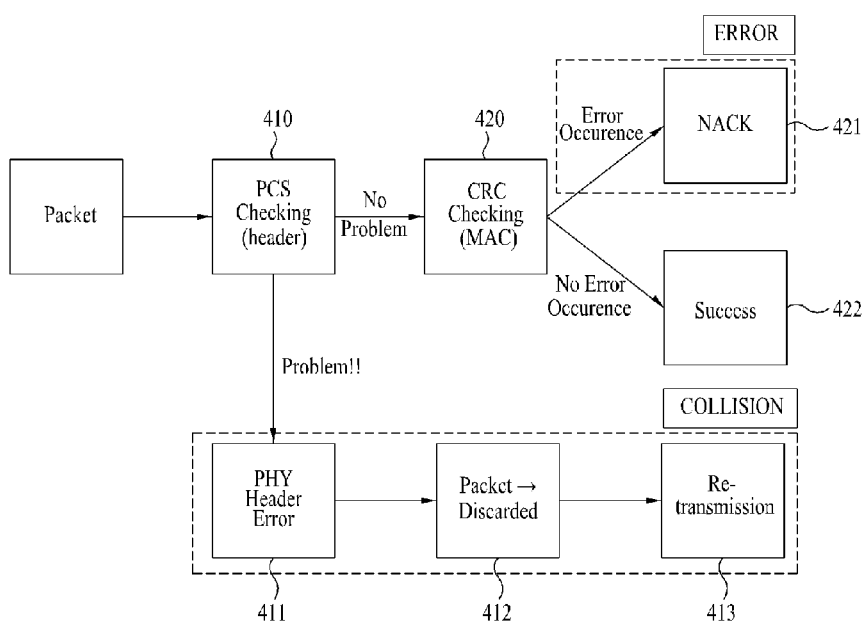
FIG. 5 is a detailed diagram depicting an error recognition procedure (ERP)

Regarding this discrimination, FIG. 5 depicts the details of an error recognition procedure (ERP).

Referring to FIG. 5, if a data is received such that a preamble and header of a physical layer are broken [411], it may be determined that a data collision has occurred. Generally, when a data collision occurs, interpretation of the data is impossible because the data is received with a broken physical layer header. In this case, a packet check sequence (PCS) is a method for checking for errors within a packet. If decoding of a physical layer convergence protocol (PLCP) header is impossible, a receiving station may determine that a data collision has occurred.

If a data collision occurs, the receiving station discards the received packet [412] and may then make a request for retransmission to the transmitting station. If so, the transmitting station retransmits the corresponding packet [413].

Meanwhile, if no problem exists at the physical layer and a broken MAC protocol data unit (MAC MPDU) is detected, it may be determined that an error has occurred [421]. The MAC layer is able to detect the presence or absence of an error occurrence through a CRC check. The transmitting station then may adjust a transmission rate by applying the above result value to AFB. If there is no error occurrence, both of the receiving and transmitting stations may determine that the packet transmitting and receiving has been successful [422].

Although an error occurs, the physical header usually has no problem. Hence, it may be assumed that the error occurrence probability due to the physical layer is almost zero. Because the physical layer header is a part for performing the most reliable transmission, this assumption is reasonable.

Consequently, the receiving station may still determine an error occurrence if error is detected at the MAC layer despite the fact that a physical layer is normally interpreted. When receiving a data from a physical layer that cannot be interpreted, the receiving station may determine the occurrence of a data collision.

Meanwhile, for reliable decoding when the transmission data rate is adjusted, a decoding error rate correspondingly varies and may degrade the reliability of the decoding. If a transmission data rate is varied, the error rate of decoding varies correspondingly.

Therefore, a method of securing the decoding reliability when variation of the transmission data rate is needed.

In the following description, a method of increasing the SNR by raising a transmission power level is explained. When the transmission power is raised, the decoding reliability is maintained despite increasing the data rate.

Figure 6:
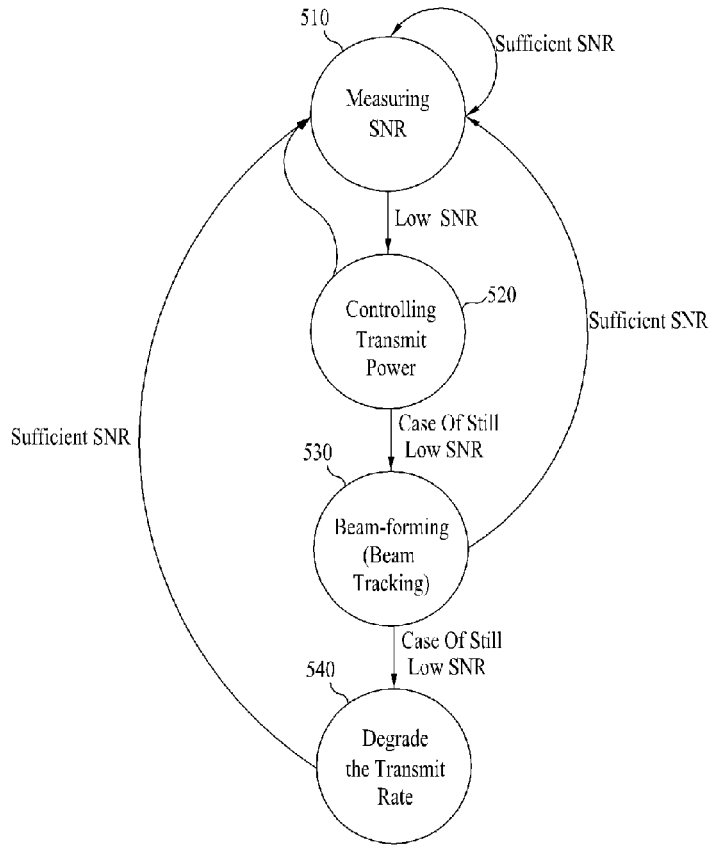
FIG. 6 is a flowchart depicting a transmission power control method according to one embodiment of the present invention.

FIG. 6 is a flowchart depicting a transmission power control method according to one embodiment of the present invention.

The method shown in FIG. 6 may be especially beneficial in overcoming a low SNR.

Referring to FIG. 6, a receiving station measures an SNR value [510] and then feeds back the measured SNR value to a receiving station.

When the measured SNR is low at the receiving station, the transmitting station may the transmission power in order to increase the SNR [520].

Yet, even when the transmitting station has increased the transmission power, the SNR may still be low or may be insufficient. If so, the transmitting or receiving station may improve it ability to collect energy in one direction by beam forming [530]. In doing so, beam tracking may be performed.

If the SNR of the receiving station is still low despite the above step, the transmitting station uses a last means of lowering the data transmission rate [540].

Meanwhile, if the transmitting station receives a transmission power control command from the receiving station, it may control the transmission power according to the received transmission power control command.

In the above-described method, the step of raising the data transmission rate may be replaced by the step of lowering the transmission power. Alternatively, the data transmission rate adjusting step may be accompanied by the transmission power controlling step, i.e., both the data transmission rate and the transmission power may be varied in order to achieve the desire SNR.

Figure 7:
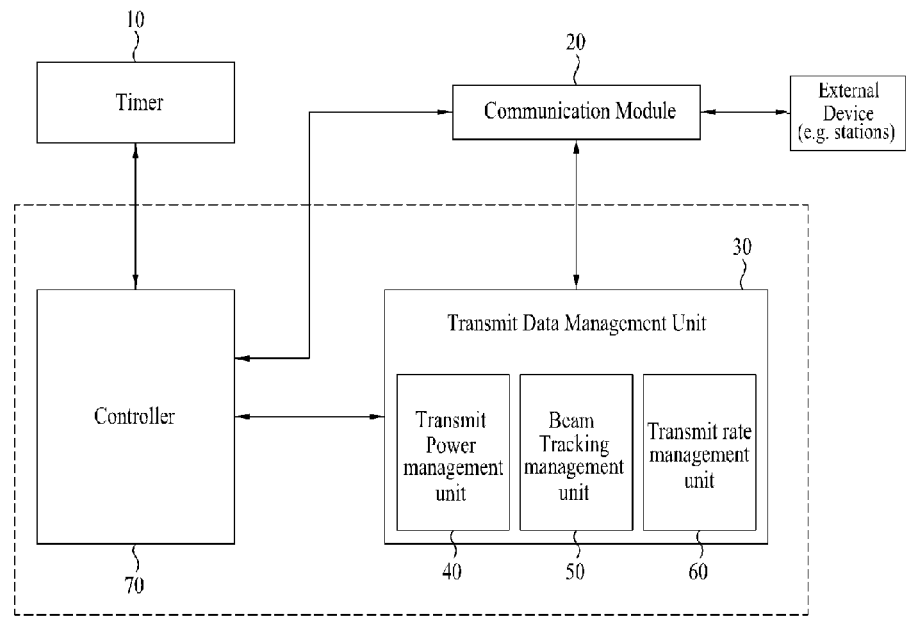
FIG. 7 is a block diagram depicting a station according to one embodiment of the present invention.

FIG. 7 is a block diagram depicting a station according to one embodiment of the present invention.

Referring to FIG. 7, a station according to one embodiment of the present invention may include a timer 10, a communication module 20, a transmit data management unit 30 and a controller 70.

The timer 10 may indicate a start and end of a beacon interval indicating an interval between a beacon signal and a next beacon signal or an interval between a beacon period and a next beacon period. The timer 10 may provide timing information within the beacon interval.

The communication module 20 may transmit data or a signal to another station. The communication module 20 may receive data or a signal transmitted by another station.

The transmit data management unit 30 may adjust the transmission power, initiate beam tracking or adjust the data transmission rate to control data transmission. The transmit data management unit 30 may include a transmit power management unit 40, a beam tracking management unit 50 and a transmit rate management unit 60.

The transmit power management unit 40 may increase or decrease the transmission power under the control of the controller 70. The beam tracking management unit 50 may initiate and control the beam tracking process under the control of the controller 70. The transmit rate management unit 60 may increase or decrease a data transmission rate under the control of the controller 70.

The controller 70 may control data transmission by controlling the transmit power management unit 40 when receiving feedback information indicating an error signal from a specific station via the communication module 20. In this case, the error signal may contain a SNR, a packet error rate (PER) or the like. In the present invention, the error signal is described based on the SNR, the present invention is not limited only to this type of error signal.

When receiving an error signal indicating that a SNR value is lower than a reference value, the controller 70 may increase the transmission power by controlling the transmit power management unit 40. When receiving an error signal indicating that an SNR value is lower than a reference value even when the transmission power is increased, the controller 70 may initiate and control a beam tracking process by controlling the beam tracking management unit 50. After initiating the beam tracking process, when receiving an error signal indicating that the SNR value is lower than a reference value, the controller 70 may lower the data transmission rate by controlling the transmit rate management unit 60.

The controller 70 may control the determination of data collisions or data transmission errors. When a data collision is determined, the controller 70 controls the beam tracking management unit 50 to perform the beam tracking process. When a data transmission error is determined, the controller 70 may control the transmit power management unit 40 to lower the transmission power. In this case, the data is configured by a packet unit. The packet includes a PHY header and a MAC header. A data collision may be detected by reading the PHY header. The error may be detected by reading the MAC header. In particular, the data collision is determined by the presence or absence of damage caused to the PHY header. The data transmission error is determined by the presence or absence of damage caused to the MAC header.

The controller 70 may request a transmission power control report from a specific station. The controller 70 may adjust the transmission power by controlling the transmit power management unit 40 based on a response to the transmission power control report received from the specific station.

In this disclosure of the present invention, the roles of the controller 70 and the transmit data management unit 30 are separately described. It is understood that the controller 70 can play a role as the transmit data management unit 30 as well.

The present invention may be applicable to such a system using a directional beam as mmWave and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

MODE FOR THE INVENTION

Various embodiments have been described in the best mode for carrying out the invention.

INDUSTRIAL APPLICABILITY

The present invention may be applicable to such a system using a directional beam as mmWave and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for controlling data transmission in a station in a wireless communication network, the method comprising:
    transmitting, by a communication module, data to a target station;
    receiving, by the communication module, feedback information including error information from the target station, the error information being measured by the target station and including a first signal to noise ratio (SNR);
    increasing, by a controller, a transmit power based on the error information when the first SNR is lower than a predetermined value; and
    performing, by the controller, a beam-forming process when a second SNR is still lower than the predetermined value after increasing the transmit power,
    wherein the second SNR is related to the increased transmit power.

2. The method of claim 1, further comprising:
    decreasing, by the controller, a data transmission rate when a third SNR is still lower than the predetermined value after performing the beam-forming process,
    wherein the third SNR is related to a directional signal determined by the beam-forming process.

3. The method of claim 1, wherein the error information includes a packet error rate (PER).

4. A method for controlling data transmission in a station in a wireless communication network, the method comprising:
    transmitting, by a communication module, a request command to a target station, the request command requesting a transmit power control report;
    receiving, by the communication module, a response command from the target station, the response command including a request to adjust a transmit power and including a first signal to noise ratio (SNR);
    increasing, by a controller, the transmit power when the first SNR is lower than a predetermined value; and
    performing, by the controller, a beam-forming process when a second SNR is still lower than the predetermined value after increasing the transmit power, and
    wherein the second SNR is related to the increased transmit power.

5. The method of claim 4, further comprising:
    decreasing, by the controller, a data transmission rate when the third SNR is still lower than the predetermined value after performing the beam-forming process,
    wherein the third SNR is related to a directional signal determined by the beam-forming process.

6. A method for controlling data transmission in a station in a wireless communication network, the method comprising:
    transmitting, by a communication module, data to a target station;
    receiving, by the communication module, a feedback message from the target station,
    wherein the feedback message includes data reception state information, the data reception state information being observed in a PHY layer and in a MAC layer from the target station;
    determining, by a controller, whether cause of a failure in data communication from the station is a data collision or a data transmission error based on the feedback message, when data transmitted from the station is not received at the target station;
    performing, by the controller, a beam tracking process when the data collision is determined; and
    controlling, by the controller, a transmit power of the station when the data transmission error is determined.

7. The method of claim 6, wherein the data is a packetized data, and the packetized data includes at least one packet with a PHY header and a MAC header, and wherein the data collision is determined by checking the PHY header, and the data transmission error is determined by checking the MAC header.

8. The method of claim 7, wherein the checking the PHY header includes reading the PHY header, and the checking the MAC header includes reading the MAC header.

9. An apparatus for controlling data transmission in a wireless station, the apparatus comprising:
    a communication module configured to receive data from an external station, and configured to transmit data to the external station; and
    a controller configured to:
    control the communication module to receive feedback information including error information from the external station, the error information being measured by the external station and including a first signal to noise ratio (SNR),
    increase a transmit power when the first SNR is lower than a predetermined value, and
    perform a beam-forming process when a second SNR is still lower than the predetermined value after increasing the transmit power,
    wherein the second SNR is related to the increased transmit power.

10. The apparatus of claim 9, wherein the controller is configured to decrease a transmission data rate of data when a third SNR is still lower than the predetermined value after performing the beam-forming process, and
    wherein the third SNR is related to a directional signal determined by the beam-forming process.

11. The apparatus of claim 9, wherein the error information includes a packet error rate (PER).

12. An apparatus for controlling data transmission in a wireless station, the apparatus comprising:
    a communication module configured to receive data from an external station, and configured to transmit data to an external station; and
    a controller configured to:
    control the communication module to transmit a request command to the external station, the request command requesting a transmit power control report from the external stations,
    control the communication module to receive the transmit power control report from the external station,
    increase the transmit power when a first signal to noise ratio (SNR) is lower than a predetermined value, based on the transmit power control report, and
    perform a beam-forming process when a second SNR is still lower than the predetermined value after increasing the transmit power,
    wherein the transmit power control report includes a request to adjust a transmit power and includes a first SNR, and
    wherein the second SNR is related to the increased transmit power.

13. The apparatus of claim 12,
wherein the controller is further configured to decrease a transmission data rate of the data when the a third SNR is still lower than the predetermined value after performing the beam-forming process, the third SNR being related to a directional signal determined by the beam-forming process.

14. An apparatus for controlling data transmission in a wireless station, the apparatus comprising:
  a communication module configured to receive data and a feedback message from an external station, and configured to transmit data to an external station,
  wherein the feedback message includes data reception state information, the data reception state information being observed in a PHY layer and in a MAC layer from the external station; and
  a controller configured to:
  determine whether cause of a failure in data communication from the station is a data collision or a data transmission error based on the feedback message, when data transmitted from the station is not received at another station,
  perform a beam tracking process when the data collision is determined, and
  control a transmit power of the station when the data transmission error is determined.

15. The apparatus of claim 14, wherein the data is a packetized data, and the packetized data includes at least one packet with a PHY header and a MAC header, and wherein the data collision is determined by checking the PHY header, and the data transmission error is determined by checking the MAC header.

16. The apparatus of claim 15, wherein the checking the PHY header includes reading the PHY header, and the checking the MAC header includes reading the MAC header.

* * * * *